United States Patent Office 2,984,590
Patented May 16, 1961

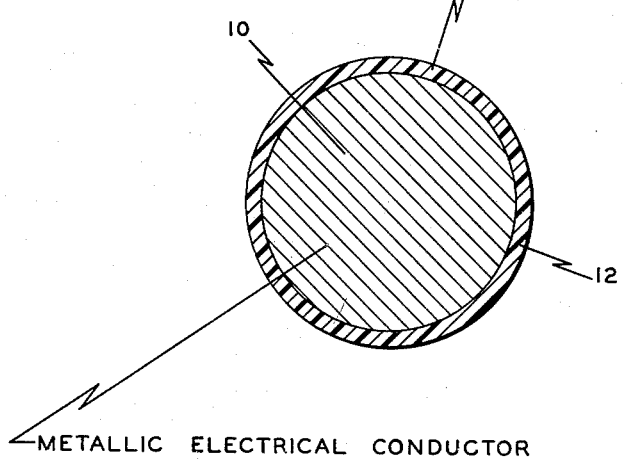

2,984,590

COMPOSITE MATERIAL AND METHOD FOR THE PRODUCTION THEREOF

Edward P. Anderson, Livingston, N.J., assignor, by mesne assignments, to Engelhard Industries, Inc., Newark, N.J., a corporation of Delaware Filed Dec. 19, 1957, Ser. No. 703,982

7 Claims. (Cl. 117—232)

The present invention is concerned with a composite material having a base coated uniformly with an insulating and heat resistant layer, such as insulated electrical wires and cables.

There is a need for such insulated conductors, for example as lead-in wires to resistance thermometers operating at high temperatures, and numerous materials have been suggested for coating metal wires, comprising basically thermosetting silicone resins in an organic solvent and mixed with finely-divided silicates, metal oxides or the like. These materials are applied to the wire base by any of the customary methods of, for example, dipping or spraying, and are subsequently subjected to a heat treatment to harden and cure the resin. The coatings obtained combine the properties of flexibility and resistance to heat up to about 700° F. However, at higher temperatures the silicone resins begin emitting an increasing quantity of volatile matter causing severe damage to the coatings.

It has been found that the above-described disadvantage can be eliminated or at least reduced to a negligible amount, thus permitting the production of coated bases such as insulated wires resisting temperatures up to 1,000° F. This is accomplished according to the present invention by adding finely-divided mica and cristobalite silica to a thermosetting silicone resin solution in an organic solvent, applying the resulting mixture to a base, for example the wire to be coated, and subjecting it to a comparatively slow drying and baking process.

The drawing illustrates a conductor 10 in cross section, having a heat-resistant coating 12 applied to it, in accordance with the invention. The conductor and coating are of the compositions defined elsewhere in the present specification.

In this disclosure, by the term silicone resin any of the numerous organo siloxane polymers or mixtures thereof, known also as organo silicone oxide polymers, will be understood. Their structural composition comprises giant molecules of silicon atoms connected to each other by oxygen atoms through silicon-oxygen linkages, thus forming chains of linear polymers which may be cross-linked to each other generally by further oxygen bridges. The chain molecules have the structural formula

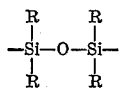

wherein R stands for substituted and unsubstituted alkyl or aryl radicals and the numerous different varieties of resins available on the market are obtained by the great amount of possible substitution, cross-linkage and mixtures of the products.

Whereas the quantity of the organic solvent to be used depends upon the viscosity desired, according to the method chosen for the coating step which may be dipping, spraying, extruding or the like, the silicone resin is present in the finished coating from 10 to 50, preferably from 20 to 40 percent by weight and the mica and cristobalite silica each comprise between 5 and 85, preferably 5 and 75 percent by weight of the finished coating.

The mica may have a particle size in the range of mica flake to 500 mesh, generally about 30 to 300 mesh, whereas the silica and the filler are used in the particle size range from 30 to 600 mesh, preferably about 300 mesh.

Among the solvents generally used are xylene, toluene, methyl ethyl ketone, carbon tetrachloride or the like.

It is believed that the superior heat resistance of the coatings according to the invention is due to some change in the crystal structure, which may consist of the formation of mixed crystals of the components, whereby the metal of the wire may enter into the recrystallization process. This explanation finds good support in the fact, proven by numerous tests, that the use of silica in its cristobalite form improves the coatings appreciably, cristobalite being the crystalline structure of silica which is stable at very high temperatures.

Furthermore, by first air drying and then baking comparatively slowly, the transition from the initial into the new crystal form seems to be favored. Best results are obtained by drying at room temperature or at temperatures up to about 180° F. for a period of up to about 8 hours and by baking at temperatures up to about 500° F. for about one-half to about 4 hours.

In addition to the aforementioned components, the coatings according to the invention may contain, besides a coloring agent, a filler of one or more refractory oxides or high or low silicates, for example zircon, also finely-divided.

Electrical conductors, such as metal wires made from copper, silver, nickel or any other suitable metal or alloy, when coated according to the invention, receive a protective covering consisting, for example, of a woven braid of stainless steel and/or glass fiber and, if desired, the steps of drying and preliminary baking are performed to a degree which will permit the application of the braid, whereupon the final baking and curing can be effected.

In the following example, one embodiment of the present invention is illustrated in which mica, silica in its cristobalite form and zircon as a filler are used in equal parts by weight.

*Example 1*

A powder mixture of equal parts by weight of cristobalite silica having a particle size of 325 mesh, mica having a particle size of 100 mesh and zircon having a particle size of 325 mesh was prepared in a blending machine and used in the following composition:

53% powder mixture
20% solid silicon resin ⎫ Dow Corning,
20% xylene            ⎭ Resin 805
7% methyl ethyl ketone By agitating in a mixer for 20 minutes, a paste was obtained in which copper wires were dipped, thus producing an even and uniform layer of about 1/16 inch thickness thereon.

The wires were allowed to dry in air at room temperature for 3 hours and were subsequently baked for two hours at a temperature of 300° F. The finished coating, containing no solvents, constituted a mixture of about 28 percent silicone resin, 24 percent cristobalite silica, 24 percent mica and 24 percent zircon.

It will be obvious to those skilled in the art that many modifications may be made within the scope of the present invention without departing from the spirit thereof, and the invention includes all such modifications.

What is claimed is:

1. A composite material comprising a metallic electrical conductor coated substantially uniformly and completely with a thin layer comprising 10 to 50 percent by weight of a thermosetting silicone resin, 5 to 85 percent by weight of mica and 5 to 85 percent by weight of cristobalite silica.

2. A composite material comprising a metallic electrical conductor coated substantially uniformly and completely with a thin layer comprising 20 to 40 percent by weight of a thermosetting silicone resin, 5 to 75 percent by weight of mica and 5 to 75 percent by weight of cristobalite silica.

3. A composite material comprising a metallic electrical conductor coated substantially uniformly and completely with a thin layer comprising 20 to 40 percent by weight of a thermosetting silicone resin, 5 to 70 percent by weight of mica, 5 to 70 percent by weight of cristobalite silica and 5 to 70 percent by weight of a filler selected from the group consisting of refractory oxides and high and low silicates.

4. A composite material comprising a metallic electrical conductor coated substantially uniformly and completely with a thin layer comprising 20 to 40 percent by weight of a thermosetting silicone resin, the rest comprising about equal parts by weight of mica, cristobalite silica and a filler selected from the group consisting of refractory oxides and high and low silicates.

5. A method for producing a composite material by incorporating into an organic solvent about 10 to 50 percent by weight of a thermosetting silicone resin, about 5 to 85 percent by weight of mica and about 5 to 85 percent by weight of cristobalite silica, coating a metallic electrical conductor substantially uniformly and completely with a thin layer of the mixture, drying at a temperature in the range of room temperature to about 180° F. for a period not in excess of about 8 hours, and baking at a temperature up to about 500° F. for about 0.5 to 4 hours.

6. A method according to claim 5, the mixture including a filler selected from the group consisting of refractory oxides and high and low silicates.

7. A composite material comprising a metallic electrical conductor and a thin layer of insulating material on the surface of said conductor, said insulating material comprising 10 to 50 percent by weight of a thermosetting silicone resin, 5 to 85 percent by weight of cristobalite silica, and 5 to 85 percent of an inert filler.

References Cited in the file of this patent

UNITED STATES PATENTS

| | | |
|---|---|---|
| 2,557,928 | Atkinson | June 26, 1951 |
| 2,626,223 | Sattler et al. | Jan. 20, 1953 |
| 2,707,179 | Peyrot et al. | Apr. 26, 1955 |
| 2,710,289 | Johnannsen | June 7, 1955 |
| 2,723,966 | Youngs | Nov. 15, 1955 |
| 2,875,105 | Troester | Feb. 24, 1959 |

OTHER REFERENCES

Sosman: "The Properties of Silica," No. 37, 1927. (Copy in Div. 59.)

Searle: "Refractory Materials," 3rd ed., 1950. (Copy in Div. 56.)